US012793287B1

(12) United States Patent
Del Giudice

(10) Patent No.: US 12,793,287 B1
(45) Date of Patent: Nov. 10, 2026

(54) SYSTEMS AND METHODS FOR IMPLEMENTING A CUSTOMIZABLE AVATAR IN ONE OR MORE SOURCES

(71) Applicant: TCG World US Inc., Lewes, DE (US)

(72) Inventor: Justin Louis Del Giudice, Plantsville, CT (US)

(73) Assignee: TCG World US Inc., Lewes, DE (US)

( * ) Notice: Subject to any disclaimer, the term of this patent is extended or adjusted under 35 U.S.C. 154(b) by 140 days.

(21) Appl. No.: 18/409,724

(22) Filed: Jan. 10, 2024

Related U.S. Application Data

(60) Provisional application No. 63/438,231, filed on Jan. 10, 2023.

(51) Int. Cl.
*G06T 11/00* (2026.01)
*G06T 19/00* (2011.01)

(52) U.S. Cl.
CPC .............. *G06T 11/00* (2013.01); *G06T 19/00* (2013.01)

(58) Field of Classification Search
CPC ................................ G06T 11/00; G06T 19/00
USPC .......................................................... 345/619
See application file for complete search history.

(56) References Cited

U.S. PATENT DOCUMENTS

| | | | | |
|---|---|---|---|---|
| 11,756,277 | B1 * | 9/2023 | Horesh | A63F 13/655 345/633 |
| 2014/0035913 | A1 * | 2/2014 | Higgins | G06Q 30/0641 345/420 |
| 2017/0287060 | A1 * | 10/2017 | Choi | G06T 15/04 |
| 2022/0345537 | A1 * | 10/2022 | Samms | H04L 67/535 |
| 2024/0062430 | A1 * | 2/2024 | Bradley | G06T 11/00 |

* cited by examiner

*Primary Examiner* — Hai Tao Sun
(74) *Attorney, Agent, or Firm* — Edmondson IP Law; J. Curtis Edmondson

(57) ABSTRACT

A system and method for implementing a customizable avatar in one or more sources. The system includes a processor in communication with a memory. The processor is configured to receive one or more body measurements and one or more physical details from a user. The processor is further configured to generate a user avatar based on the one or more body measurements and the one or more physical details received. In addition, the processor is configured to generate a virtual representation of the user avatar representing the user within the one or more sources. The virtual representation of the user avatar reflects a physical appearance of the user.

19 Claims, 10 Drawing Sheets

SYSTEMS AND METHODS FOR IMPLEMENTING A CUSTOMIZABLE AVATAR IN ONE OR MORE SOURCES

CROSS-REFERENCE TO RELATED APPLICATIONS

This application claims priority to U.S. Patent Application No. 63/438,231 filed on Jan. 10, 2023, the complete disclosure of which, in its entirely, is herein incorporated by reference.

FIELD

This disclosure relates to the field of digital avatars. More specifically, the field relates to a system and method for implementing a customizable avatar in one or more sources.

BACKGROUND

Virtual shopping refers to shopping for goods and services in a virtual or digital environment. Virtual shopping may be conducted using technology or electronic devices like computers, smartphones, or virtual reality (VR) devices. Over the last decade, virtual shopping has evolved due to advancements in technology and the widespread availability of the internet. The ease of perusing and purchasing goods without physically going to a physical store is provided by virtual shopping.

In virtual shopping, customers cannot physically inspect or try out products before purchasing. This may lead to dissatisfaction if the product received does not meet their expectations. Virtual shopping may lack the personal touch and human interaction that some customers value in traditional retail settings. Customers cannot touch, smell, or feel products, which may impact their ability to make informed purchasing decisions. This may impact customer loyalty and satisfaction. Further, the reviews provided on online platforms may not be accurate, or the reviews may be fake. This may make it challenging for customers to rely on them to make appropriate purchases. Thus, there is a need for a solution where customers can experience the look and feel of products within a virtual environment before purchasing.

SUMMARY

The present disclosure discloses a system for implementing a customizable avatar in one or more sources. The system includes a processor in communication with a memory. The processor is configured to receive one or more body measurements and one or more physical details from a user. The processor is further configured to generate a user avatar based on the one or more body measurements and the one or more physical details received. In addition, the processor is configured to generate a virtual representation of the user avatar representing the user within the one or more sources. The virtual representation of the user avatar reflects a physical appearance of the user.

In accordance with the aspects of the disclosure, the one or more sources include a virtual world, metaverse, or Web3 applications.

In accordance with the aspects of the disclosure, the processor is further configured to enable the user operating the user avatar within at least one source to try on one or more products virtually. The one or more products are tried on within one or more virtual stores within each source. The processor is further configured to present a view of the user avatar once the one or more products are virtually tried and receive feedback from the user based on the view presented to them.

In accordance with the aspects of the disclosure, the processor is further configured to recommend one or more products for the user operating the user avatar in the one or more sources to try on virtually. The one or more products are recommended based on one or more inputs received from the user. The processor is further configured to present a view of the user avatar upon selection of at least one product recommended by the user.

In accordance with the aspects of the disclosure, the processor is further configured to set up an interaction environment for the user avatar within the one or more sources based on the view and generate one or more personalized recommendations for the user avatar based on a response within the interaction environment.

In accordance with the aspects of the disclosure, the processor is further configured to recommend one or more events for the user avatar to participate in within the one or more sources.

In accordance with the aspects of the disclosure, the processor is further configured to monitor a progress of the user avatar within the one or more sources, generate a progress report of the user avatar based on the progress monitored, and present one or more suggestions for the user avatar based on the progress monitored.

In accordance with the aspects of the disclosure, the processor is further configured to enable the user to share the user avatar to one or more platforms.

In accordance with the aspects of the disclosure, the processor is further configured to monitor a response of the user avatar when shared to the one or more platforms.

In accordance with the aspects of the disclosure, the processor is further configured to generate an avatar score based on the user avatar generated.

The present disclosure also discloses a method for implementing a customizable avatar in one or more sources. The method includes receiving one or more body measurements and one or more physical details from a user. The method further includes generating a user avatar based on the one or more body measurements and the one or more physical details received. In addition, the method includes generating a virtual representation of the user avatar representing the user within the one or more sources. The virtual representation of the user avatar reflects a physical appearance of the user.

In accordance with the aspects of the disclosure, the one or more sources include a virtual world, metaverse, or Web3 applications.

In accordance with the aspects of the disclosure, the method further includes enabling the user operating the user avatar within at least one source to try on one or more products virtually. The one or more products are tried on within one or more virtual stores within each source. The method further includes presenting a view of the user avatar once the one or more products are virtually tried and receive feedback from the user based on the view presented to them.

In accordance with the aspects of the disclosure, the method further includes recommending one or more products for the user operating the user avatar in the one or more sources to try on virtually. The one or more products are recommended based on one or more inputs received from the user. The method further includes presenting a view of the user avatar upon selection of at least one product recommended by the user.

In accordance with the aspects of the disclosure, the method further includes setting up an interaction environment for the user avatar within the one or more sources based on the view and generating one or more personalized recommendations for the user avatar based on a response within the interaction environment.

In accordance with the aspects of the disclosure, the method further includes recommending one or more events for the user avatar to participate in within the one or more sources.

In accordance with the aspects of the disclosure, the method further includes monitoring a progress of the user avatar within the one or more sources, generating a progress report of the user avatar based on the progress monitored, and presenting one or more suggestions for the user avatar based on the progress monitored.

In accordance with the aspects of the disclosure, the method further includes enabling the user to share the user avatar to one or more platforms and monitoring a response of the user avatar when shared to the one or more platforms.

In accordance with the aspects of the disclosure, the method further includes generating an avatar score based on the user avatar generated.

The present disclosure also discloses one or more non-transitory computer-readable storage mediums storing one or more sequences of instructions. The one or more sequence of instructions are executed by a processor configured to receive one or more body measurements and one or more physical details from a user. The one or more processors are further configured to generate a user avatar based on the one or more body measurements and the one or more physical details received. In addition, the one or more processors are configured to generate a virtual representation of the user avatar representing the user within the one or more sources. The virtual representation of the user avatar reflects a physical appearance of the user.

BRIEF DESCRIPTION OF THE DRA WINGS

DETAILED DESCRIPTION

Embodiments of the present disclosure will now be described with reference to the accompanying drawing.

Embodiments are provided to convey the scope of the present disclosure thoroughly and fully to the person skilled in the art. Numerous details are set forth relating to specific components and methods to provide a complete understanding of the embodiments of the present disclosure. It will be apparent to the person skilled in the art that the details provided in the embodiments may not be construed to limit the scope of the present disclosure. In some embodiments, well-known processes, apparatus structures, and techniques are not described in detail.

The terminology used in the present disclosure is for the purpose of explaining a particular embodiment, and such terminology may not be considered to limit the scope of the present disclosure. As used in the present disclosure, the forms "a," "an," and "the" may be intended to include the plural forms as well unless the context clearly suggests otherwise. The terms "comprises," "comprising," "including," and "having," are open-ended transitional phrases and, therefore, specify the presence of stated features, elements, modules, units, and/or components but do not forbid the presence or addition of one or more other features, elements, components, and/or groups thereof. The particular order of steps disclosed in the method and process of the present disclosure is not to be construed as requiring their performance as described or illustrated. It is also to be understood that additional or alternative steps may be employed.

Figure 1:
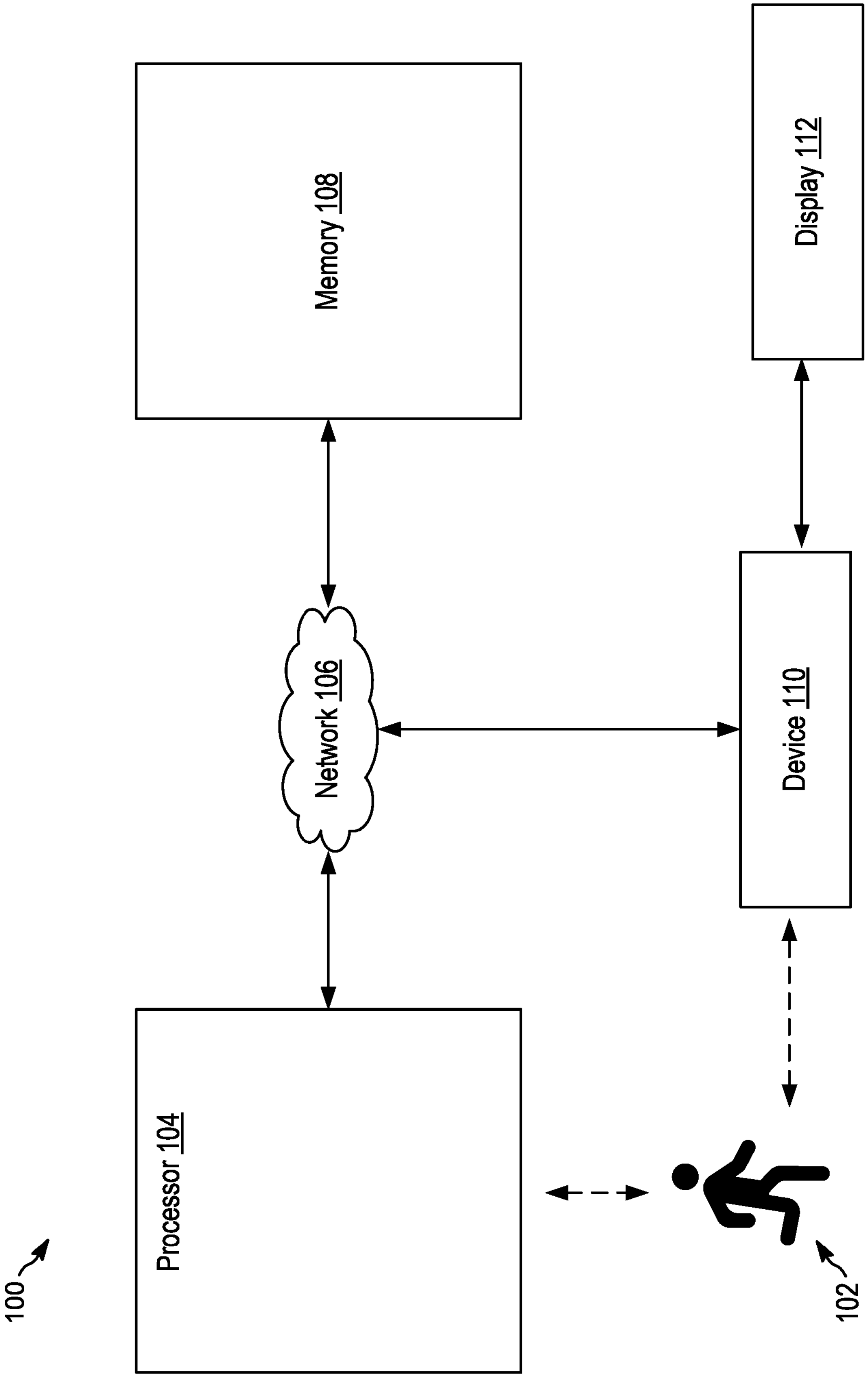
FIG. 1 illustrates a block diagram of the components of the system according to an embodiment herein.

FIG. 1 illustrates a block diagram of the components of the system 100 for implementing a customizable avatar in one or more sources according to an embodiment herein. As shown, the system 100 includes a user 102, a processor 104, a network 106, a memory 108, a device 110, and a display 112. The avatar may be customizable to specific body measurements of a user 102. Examples of the device 110 include but are not limited to a personal computer (PC), mobile device, smartphone, tablet, personal device assistant (PDA), and the like. Examples of the display 112 include but are not limited to cathode-ray tube (CRT), a liquid-crystal display (LCD), a light-emitting diode (LED) display, plasma, OLED, a cell phone/mobile phone display, and the like.

Examples of the one or more sources include but are not limited to a virtual world, metaverse, Web3 venues, and the like. The device 110 is owned by the user 102. Further, the device 110 may be imported by the user 102 into the one or more sources for performing one or more purchases. Examples of the user 102 includes but is not limited to students, employees, businessmen, senior citizens, and the like. The processor 104 and the memory 108 are in communication with each other via the network 106. The device 110 presents visual representations of information communicated by the processor 104 for the user 102 to view. The user 102 has the flexibility to modify the device 110 according to their requirements. This will thus enhance their viewing experience.

Figure 2:
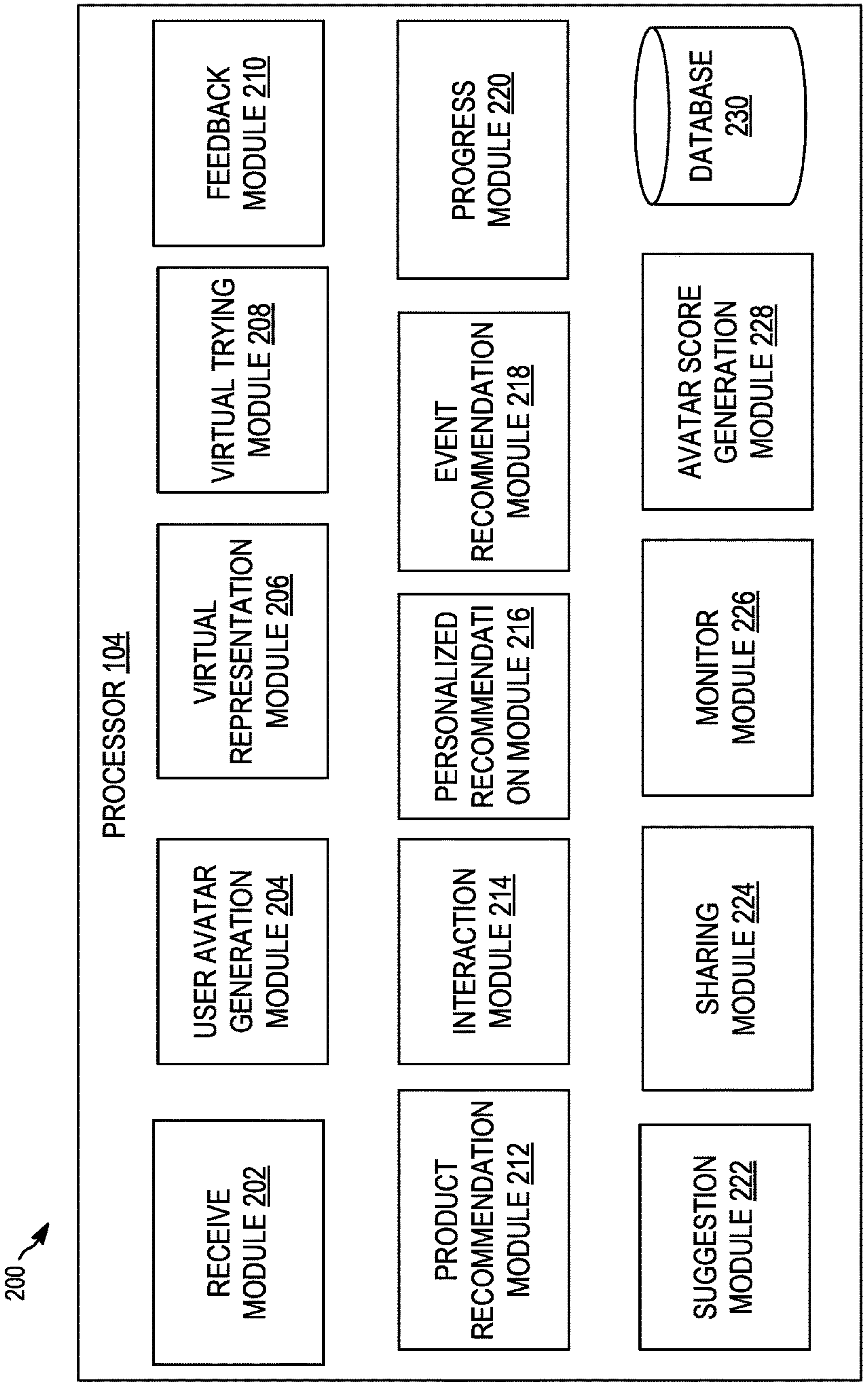
FIG. 2 illustrates an exploded view of the processor of FIG. 1 according to an embodiment herein.

FIG. 2 illustrates an exploded view 200 of the processor 104 of FIG. 1 according to an embodiment herein. As shown, the processor 104 includes a receive module 202, a user avatar generation module 204, a virtual representation module 206, a virtual trying module 208, a feedback module

210, a product recommendation module 212, an interaction module 214, a personalized recommendation module 216, an event recommendation module 218, a progress module 220, a suggestion module 222, a sharing module 224, a monitor module 226, an avatar score generation module 228, and a database 230. The functionality of each module is explained in further detail below.

In an embodiment, the user 102 first registers themselves by creating a profile at the time of registration on the avatar application, which is installed in the device 110. The profile of the user 102 is stored in the database 230. In an example, the profile may include information such as personal details, profile picture, biometric data, hobbies, favorite sports/games, location, IP address. Further, the user 102 may update their profile details at any point in time, and these changes may instantly be updated in the database 230. The user 102 may create more than one profile in the avatar application and may also link one or more profiles to a main profile. The avatar application is capable of generating a user avatar of the user 102 based on exact body measurements and proportions of the user 102, that may be used within the one or more sources for making purchases. More details regarding this is explained in further detail below.

In an embodiment, the user 102 is authenticated once they enter into the one or more sources by logging into the avatar application on the device 110. The user 102 may be authenticated using password authentication, multi-factor authentication, and biometric authentication. Password authentication requires the user 102 to enter their credentials (username, password) to confirm their identity. Once the credentials are entered, they are compared against the stored credentials in the database 230, and the user 102 is granted access if the certificates match. Multi-factor authentication is a process that requires the user 102 to enter more information than just a password. For example, along with the password, they might be asked to enter a code sent to their email, answer a secret question, scan a fingerprint, and the like. Biometric authentication is a process that relies on the biological characteristics of the user 102 to verify their identity. For example, the biometric authentication method may include but is not limited to facial recognition, voice recognition, fingerprint, IRIS, and the like. The main purpose of performing strict authentication is to prevent fraud.

In an embodiment, the receive module 202 receives one or more body measurements and one or more physical details from the user 102 via the avatar application. The one or more body measurements and physical details may be manually inputted by the user 102 in the avatar application. The one or more body measurements and physical details may then be stored in the database 230. The one or more body measurements refer to different dimensions and proportions of the human body of the user 102. Examples of the one or more body measurements include but are not limited to height, weight, waist circumference, hip circumference, chest/bust circumference, inseam, arm length, neck circumference, foot length, and the like. The one or more physical details refer to the specific characteristics or features related to the physical aspect of the user 102. Examples of the one or more physical details include but are not limited to facial features, hair color, texture, style, skin tone/complexion, body size, or any other distinguishing marks. Further, the user 102 may also update the one or more body measurements and physical details information at any point in time. These changes may instantly be updated in the database 230.

In an embodiment, the user avatar generation module 204 generates a user avatar based on the one or more body measurements and the one or more physical details received by the receive module 202. The user avatar is a graphical representation or icon that represents the user 102 within the one or more sources. The user avatar may be of one or more formats, such as photographs of the user 102, cartoon-like images, custom illustrations, predefined icons, and the like. The user avatar generated may represent an identity of the user 102 and may be used to communicate with others in the one or more sources. The user avatar may also be customizable based on inputs received from the user 102 on the avatar application.

In an embodiment, the virtual representation module 206 generates a virtual representation of the user avatar generated by the user avatar generation module 204 representing the user 102 within the one or more sources. The virtual representation represents or reflects a physical appearance of the user 102. The virtual representation may be generated using a virtual generation algorithm. The algorithm first takes one or more inputs such as the preferences of the user 102, the one or more body measurements received by the receive module 202, the one or more physical details received by the receive module 202, and the like to generate the virtual representation of the user 102. The algorithm may defines the style, colors, and elements of the user avatar. The generated user avatars may be personalized to some extent, ensuring that the user 102 gets a unique and visually distinct avatar. This personalization may be based on factors like favorite colors, themes, other preferences the user 102 may provide, movements performed by the user 102 within the one or more sources, and the like. Here, the user 102 need not upload one or more images of themselves. Instead, the avatar application automatically creates the user avatar for them based on the measurement inputs provided by them via the receive module 202.

The user avatar generated may be used across one or more applications. In an example, the one or more applications may include virtual fitting rooms, virtual fashion shows, virtual personal styling, virtual fashion design, virtual product demonstration, virtual events, virtual reality training, virtual try-on experiences, virtual health care, and the like. In virtual fitting rooms, the retail stores and fashion brands may use the user avatar to allow customers to virtually try on clothing and see how it fits on their body before making a purchase. This may save time and money for both the customer and the business. In virtual fashion shows, fashion brands may use the user avatar to showcase their clothing collections in a virtual environment. This may allow customers to view and interact with the clothing in a more immersive way. In virtual personal styling, personal stylists may use the user avatar to virtually style clients and show them how different clothing options would look on their bodies. This may make it easier for the client to make decisions about their wardrobe. In virtual fashion design, fashion designers may use the user avatar to visualize their clothing designs on a virtual model, allowing them to make adjustments and fine-tune their designs before they are produced. In virtual product demonstration, businesses may use the user avatar to demonstrate their products in a virtual environment, allowing customers to see how the product works and how it would fit into their lifestyle. In virtual events, attendees may use the user avatar to participate in virtual conferences, trade shows, or other events, allowing them to move around and interact with others as if they were physically present. In virtual reality training, companies may use the user avatar to train employees in virtual reality environments, allowing them to learn new skills or practice tasks in a simulated setting that closely resembles real life. In virtual try-on experiences, the user avatar with accurate body proportions may be used to try on furniture, home decor, or other products in a virtual setting. This may give customers a better idea of how the products will look and fit in their own homes. In virtual health care, the user avatar may be used to provide virtual consultations or treatment sessions with patients, allowing healthcare providers to assess and treat patients remotely.

In an embodiment, the virtual trying module 208 enables the user 102 operating the user avatar within at least one source to try on one or more products virtually. Once the user avatar is imported into at least one source chosen by the user 102, the user avatar will be able to enter a virtual world. In an example, the virtual world may be a virtual mall or virtual shopping center in which multiple virtual shops/stores are present for the user avatar to enter into. When the user avatar walks or enters into one virtual store, it will be able to browse through the one or more products present inside the virtual store (same as if a person is physically entering a store and searching for products to buy). The details of the virtual stores are stored in the database 230. For instance, the details may include store name, history, location, products sold, top rated products, reviews, and the like. As the user avatar generated by the user avatar generation module 204 is in accordance with the body measurements and physical details of the user 102, they will be able to select products that will suit them appropriately.

In an example, the user avatar enters a virtual clothing store via the avatar application and wants to buy one or more clothing items. For example, the one or more clothing items may be a shirt, pant, socks, cap, shoes, cap, glasses, and the like. The user avatar may also go through the details of the virtual clothing store available in the database 230 of the avatar application before entering. The user avatar will be able to browse through the aisles and shelves of the virtual clothing store and accordingly make their selection. To make the selection, the user avatar clicks on the item(s) that they are interested in buying. The experience of the user 102 within the one or more sources is similar to as if they were selecting items in physical stores.

Once the selection of the item(s) is made, the virtual representation module 206 presents a view of the user avatar with the one or more clothing items on them on the avatar application. The user 102 will thus be able to clearly visualize themselves within the selection item(s), and visualize how it fits on their body before making a purchase. Alongside the view, the avatar application also presents information regarding each item worn or tried on by the user avatar. For instance, the information may include item type, manufacturer details, size, pricing, discounts (if any), stock availability, and the like. Thus, the view generated provides a pictorial representation of the user avatar including the one or more items on them along with a description of each item alongside. Such presentation may enable the user 102 to make better and quicker decisions.

In an embodiment, the feedback module 210 receives feedback from the user 102 based on the view presented by the virtual representation module 206. For instance, if the user 102 is not satisfied with items tried on by the user avatar, they may then raise their queries. In an example, within the virtual clothing store, if the shirt is lacking color or the design of the pants looks simple, the user 102 may raise these feedback queries within the avatar application. Providing feedback presents one or more insights into a store's strengths and weaknesses. This information may help businesses identify areas where they excel and areas that require enhancement. The user 102 feedback also provides insights into what they are looking for. This may enable the virtual stores to adapt and introduce new features, products, or services that align with the preferences of the user 102.

The user 102 may provide their feedback using at least one of a voice message, verbal message, email message, gesture signal, and the like. With the click of a button (not shown) on the avatar application, the user 102 may provide their voice message, verbal message, and email message. The term "button", as used herein, may refer to any touch input that, when touched, causes the application to execute a command. Examples of the button include but are not limited to a mechanical button, digital button, capacitive sensing button, inductance sensing button, and holographic button.

For voice messages, the device 110 includes an in-built speaker and microphone, to which the user 102 may speak. Once the user 102 provides their feedback/query, the processor 104 first transcribes their input speech into text, extracts keywords from the transcribed text, and then uses trained data to provide a voice answer back to the user 102. For verbal messages, a chat box is presented to the user 102 on the device 110 where they may type in their feedback/query. The chatbot is trained using machine learning (ML) algorithms and is programmed to understand questions and search for the answers in a knowledge database. The chat bot may further learn from its previous and current interactions with people for developing correct answers.

In an embodiment, the product recommendation module 212 recommends one or more products/items for the user 102 operating the user avatar in the one or more sources to try on virtually. The one or more products/items may be recommended while the user avatar is virtually present within at least one source or when the user 102 is offline of the avatar application. The one or more products may be recommended based on one or more inputs received/associated with the user 102. For instance, the one or more inputs may include the one or more body measurements and physical details received via the receive module 202, understanding the user 102, segmenting the user 102, purchase history analysis, feedback provided via the feedback module 210, and the like. The one or more input details may be available in the database 230 or may be obtained from $3^{rd}$ party sources via the use of application programming interfaces (APIs).

To effectively recommend products, it is important to gather information about the preferences of the user 102, behaviors, and history. This involves gathering information on what the user 102 likes and dislikes. This may include their favorite product categories, brands, styles, or specific features they prefer. Reviewing past purchases of the user 102 may provide one or more insights into their preferences and buying patterns. It helps identify the types of products they have shown interest in or have previously bought. Further, tracking how the user 102 navigates through websites or online platforms may reveal their interests. Analyzing the pages they visit, the products they click on, and the time spent on different sections may help build a profile of their preferences. Additionally, paying attention to feedback and reviews provided for products is also useful. This may give direct insights into what others appreciate or value about the products or services and what areas may need improvement. The one or more products recommended to the user 102 may be available in one or more virtual stores. The avatar application has links with the one or more virtual stores, thus preventing the user 102 in manually searching for the appropriate virtual store themselves.

Further, the product recommendation module 212 also determines a location of the recommended product(s) within the virtual store that the user avatar is currently in or nearby virtual stores. In an example, the location of the recommended product(s) may be presented to the user avatar as 'Aisle 3, Right Side, Second Shelve from the top'. Along with the location, the product recommendation module 212 may also navigate the user avatar to the location of the recommended product(s) when the user clicks a 'navigate' button (not shown) on the avatar application. This may be useful in cases where the virtual store is large, and may also save time in the user avatar to search from the recommended product(s) upon reaching the aisle. To try on the recommended product(s), the user avatar clicks on them.

The product recommendation module 212 communicates the one or more products recommend to the virtual trying module 208, which enables the user avatar to try on the recommended product(s) upon selection. Once tried on, the virtual representation module 206 presents a view of the user avatar. The user 102 will thus be able to clearly visualize themselves within the at least one product recommended to them, and visualize how it fits on their body. Alongside the view, the avatar application also presents additional information regarding each recommended product worn or tried by the user avatar. For instance, the additional information may include item type, manufacturer details, size, pricing, discounts (if any), stock availability, and the like.

In an embodiment, the interaction module 214 sets up an interaction environment for the user avatar within the one or more sources based on the view generated by the virtual representation module 206. The interaction environment may be set by the user 102 upon clicking an interact button (not shown) on the avatar application. The interaction environment provides a platform/opportunity for the user 102 to provide their responses (for example, feedback, concerns, or queries regarding the look of the user avatar) based on the one or more products recommended by the product recommendation module 212. The interaction environment enables the user avatar to interact with other avatars within the virtual store or nearby them. The interaction environment also enables the user avatar to provide its responses to the avatar application, which then understands the response and searches for appropriate solutions to the response. The user avatar may provide the responses using at least one of a voice message, verbal message, email message, and the like.

In an example, the product recommendation module 212 recommended an aqua color shirt, a brown pant, and sunglasses for the user 102 once they entered virtual store A in metaverse source. The product recommendation module 212 made this recommendation since the user 102 has brought brown color pants few times within the last few months and is of fair complexion. Once the user avatar has entered virtual store A, the product recommendation module 212 navigates the user avatar to the locations of each recommended product within virtual store A and the virtual trying module 208 enables the user avatar to try on the recommended products. Once tried on, the virtual representation module 206 presents the view of the user avatar from the user 102 to visualize on the device 110. The user 102 may have a doubt regarding the products tried on y them, and may click on the interact button on the avatar application. The user 102 is then provided with two options, which are interact with nearby avatars (first option) or query the avatar application (second option).

For the first option, the user avatar will be able to ask queries to nearby avatars within virtual store A. For instance, if the user 102 is not satisfied with the aqua color shirt on the brown pant worn by them, they may ask questions such as 'Is Aqua color matching on this brown pant?', 'Should I try a different color shirt on these brown pants? 'What other color shirt will match well with these brown pants'? and the like. These questions may be asked by the user avatar to the other nearby avatars upon clicking on them and using voice message or written message. The nearby avatars may then reply back to the user avatar regarding their views. For the second option, the user avatar may be able to ask the questions directly to the avatar application via voice message, written message, email message, and the like. Also, if the user 102 has other suggestions (for example, 'I would like to try a navy blue shirt with this brown pant'), they may also input them to the avatar application. Thus, the interaction module 214 provides an opportunity for the user 102 to receive inputs and share their thoughts regarding the products tried on by them or recommended to them. The avatar application takes these inputs and thoughts into consideration. This may thus help in improving the experience and satisfaction of the user 102.

In an embodiment, the personalized recommendation module 216 generates one or more personalized recommendations for the user avatar based on the response within the interaction environment and the questions/queries/modifications/suggestions raised by the user avatar within the interaction environment. The goal of personalized recommendations is to create a more customized and enjoyable experience for the user avatar. This may thus help the user 102 discover relevant content or products without having to search through vast amounts of information manually. Further, the one or more personalized recommendations may be presented to the user 102 using one or more options. The user 102 may then choose which option(s) would be best for them.

In an example, the user 102 requested the avatar application to suggest another color shirt to try with the current pants worn by the user avatar. The personalized recommendation module 216 then presents few other color shirt options for the user 102 to chose from. The options may also include any colors recommended/suggested by the user 102. When the user 102 selects at least one option, the personalized recommendation module 216 determines and navigates the user avatar to the location of the personalized recommended product(s). The user avatar may then try on these other color shirts and determine which combination (shirt pant pair) looks best. Thus, the personalized recommendation module 216 is capable in providing one or more tailored recommendations for user avatars based on one or more views, inputs, or questions raises by the user 102 operating the user avatar.

In an embodiment, the event recommendation module 218 recommends one or more events for the user avatar to participate in within the one or more sources. Examples of the one or more events include but are not limited to virtual fashion shows, virtual conferences, trade shows, virtual reality training, virtual health care, virtual consulting, and the like. The one or more events may be recommended based on the source in which the user avatar is or previous sources in which the user avatar was within.

The one or more recommendations may be determined using an AI model, which is trained to recognize patterns, learn representations, and make predictions based on large amounts of data. The AI/ML model may provide the one or more event recommendations based on one or more parameters. For instance, the one or more parameters may include actions performed by the user avatar across the sources, growth, the recommendations generated by the product recommendation module 212 and the personalized recommendation module 216, the feedback received via the feedback module 210, and the like. The one or more events may be recommended to the user 102 in real-time when they are logged into the avatar application or offline when they are logged out of the avatar application. In an example, if the user 102 purchases fashion clothes within the metaverse source, the event recommendation module 218 may recommend for the user 102 to participate in online/virtual fashion competitions. This may be a good opportunity for the user 102 to showcase their talent.

In an embodiment, the progress module 220 monitors a progress of the user avatar within the one or more sources. The progress may include monitoring one or more factors such as login time/usage time of the user avatar in each source, details of actions (for example, purchases) executed by the user avatar in the one or more sources, modifications made in the look of the user avatar, the recommendations generated by the product recommendation module 212 and the personalized recommendation module 216, the feedback received via the feedback module 210, and the like. The one or more factors may be monitored on a regular basis at specific time intervals (for example, 1 hour, 3 hours, 6 hours, 1 day, 3 days, and the like). The user 102 may also be provided with the opportunity to adjust the time interval in the avatar application for the user avatar within the one or more sources. Further, the progress module 220 generates a progress report based on the progress monitored. The progress report presents details of the one or more factors analyzed. The progress report may be in a tabular format, graphical format, image format, video format, and the like. The progress report may also include a progress score generated by the progress module 220. The progress score may be represented by a percentage, a decimal number having a range between 0 to 100, an alphabet, and the like.

In an embodiment, the suggestion module 222 presents one or more suggestions for the user avatar based on the progress monitored by the progress module 220. The one or more suggestions may be determined using an AI/ML model, which is trained to recognize patterns, learn representations, and make predictions based on large amounts of data. The AI/ML model may provide the one or more suggestions based on one or more parameters. For instance, the one or more parameters may include growth, interests/hobbies, feedback, the progress monitored by the progress module 220, and the like.

The growth parameter corresponds to an analysis of the progress or the number of instances in which the user avatar has been used across the one or more sources over a time period. In an example, the time period may be one month, three months, quarterly, yearly, and the like. Based on the analysis, recommendations/suggestions may be made to perform different purchases other than the purchases previously made, perform purchases in other sources, market/share the user avatar information to one or more other platforms, and the like. Such recommendations may help in improving the experience of the user 102 while using the avatar application. The feedback parameter corresponds to comments or replies received from others who have monitored the user avatar within the one or more sources. The number of comments received, replies to these comments, likes/dislikes, and the like may be monitored here.

Upon login to the avatar application, the suggestions may be provided to the user 102 using audio messages, written messages, email messages, and the like. For audio messages, the recommendations may be spoken to the user 102 on the device 110 used to log in to the avatar application. For written messages, the suggestions may be provided to the user 102 via a chatbot on the avatar application. The user 102 may then interact with the chatbot by asking questions or providing their feedback regarding the suggestions communicated to them.

In an embodiment, the sharing module 224 enables the user 102 to share the user avatar to one or more platform. In an example, the one or more platforms may be social media platforms, business platforms, public platforms, and the like. Once the user avatar is created and its details are stored in the database 230, the avatar application may generate a URL or QR code in which the user avatar details are embedded in. The user 102 may then share this URL or QR code with the one or more platforms.

In an embodiment, the monitor module 226 monitors a response of the user avatar when shared to the one or more platforms via the sharing module 224. The response corresponds to the reaction or views of the user avatar once communicated to the one or more sources. For instance, the monitor module 226 may monitor factors such as the number of comments received, replies to these comments, likes/dislikes, and the like within each platform that the user avatar information is shared with. The monitor module 226 may also prepare a summary of the factors monitored and present the same to the user 102. This may help the user 102 determine in which platforms the responses of the user avatar is performing better when compared to the other platforms. This may also help the user 102 in their sharing or marketing strategy of the user avatar.

In an embodiment, the avatar score generation module 228 generates an avatar score based on the user avatar generated by the user avatar generation module 204. The avatar score may be represented by a percentage, a decimal number having a range between 0 to 10, an alphabet, and the like. The avatar score may be generated based on one or more elements, such as clarity, consistency, appropriateness, quality, uniqueness, and the like. The clarity element determines whether the user avatar is clear and easily recognizable. The clarity extends to how well the user avatar represents the identity of the user 102. The consistency element evaluates whether the user avatar aligns with the identity of the user 102 and the image they want to project in the one or more sources. The user avatar should convey authenticity. If there are mismatches between the user avatar and the physical appearance/look of the user 102, it may raise questions about authenticity.

The appropriateness element checks whether the user avatar aligns with the guidelines and standards set by the avatar application. The avatar application considers whether the content of the user avatar is suitable for the intended audience. The user avatar should avoid content that may be deemed inappropriate for specific age ranges. The quality element characterizes the user avatar according to its clear resolution and well-defined details. The user 102 should be able to view the user avatar without distortion or pixelation, even when it's displayed in various sizes or resolutions. Further, the uniqueness element of the user avatar contributes to a sense of individuality. The user 102 should appreciate the opportunity to express their personality in a way that distinguishes them from others within the one or more sources.

Figure 3:
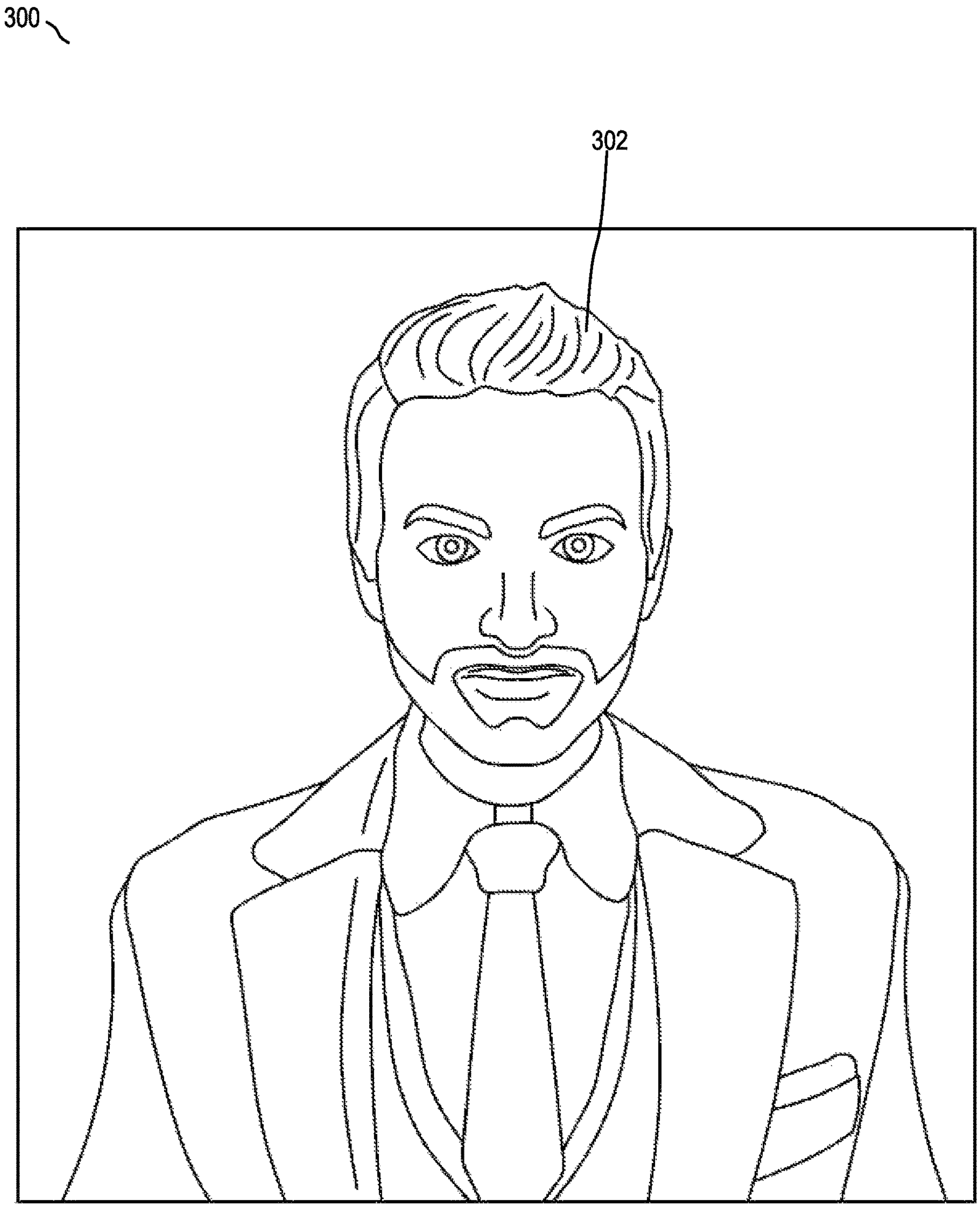
FIG. 3 illustrates a view of an avatar representing a man according to an embodiment herein.

FIG. 3 illustrates a view 300 of an avatar representing a man according to an embodiment herein. Here, the man may be referred to as the user 102. The avatar may be referred to as a user avatar 302. The user avatar 302 may be a digital representation of a person who is 5'11" tall, weighs 170 lbs, and has a 32-inch waist. The user avatar 302 has blue eyes and is dressed in a blue suit and tie. Within the one or more sources (for example, virtual world) the user avatar 302 may walk around a virtual store, browsing through the racks of suits and ties. In an example, the user avatar 302 picks up a few different styles and sizes, and then heads over to a virtual fitting room inside the virtual store. Inside the fitting room, the user avatar 302 may try on the different suits and ties and check the fit and their looks in the mirror. For instance, the user avatar 302 may turn to the side and check out the pants and jacket's fit, ensuring they are not too baggy or tight. The user avatar 302 then tries on a few different ties, adjusting the knot to see how it looks with the suit. Once the user avatar is satisfied with the fit and style, they add the chosen suit and tie to their virtual shopping cart and proceed to check out.

Figure 4:
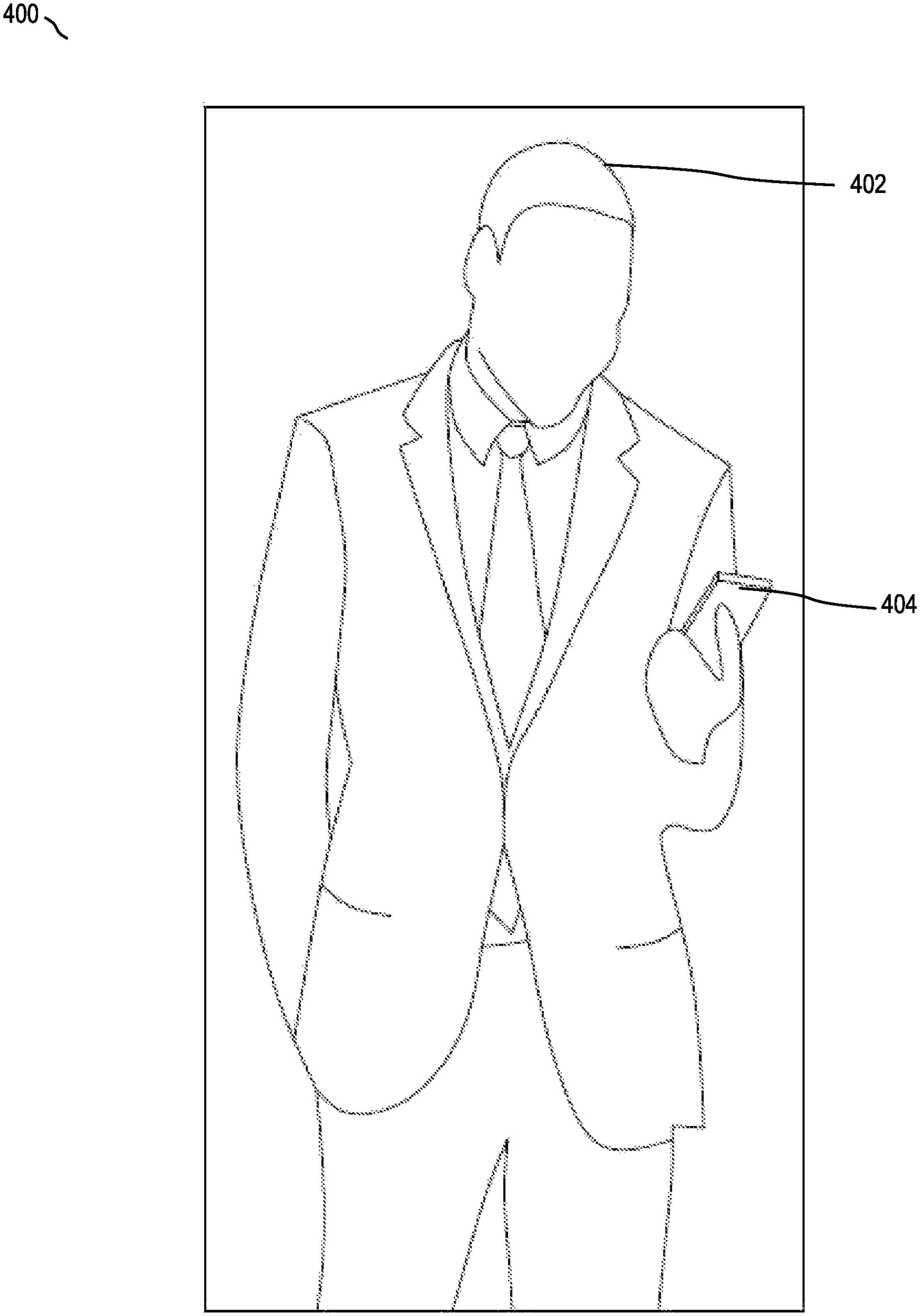
FIG. 4 illustrates a view of an avatar representing a man using an electronic product according to an embodiment herein.

FIG. 4 illustrates a view 400 of an avatar representing a man using an electronic product 404 according to an embodiment herein. Here, the man may be referred to as the user 102. The avatar may be referred to as a second user avatar 402. The view 400 of the second user avatar 402 may be within a virtual world where the electronic product 404 is being viewed. In an example, the electronic product 404 may be a mobile phone/device. The user 102 will be able to view the electronic product 404 from multiple angles and operate the electronic product 404 within the virtual world. Within the virtual world, the user avatar may also query the avatar application regarding the electronic product 404. For example, the query may be, 'Can I view mobile phones of the same manufacturer?'. The avatar application may then present the second user avatar 402 with similar mobile phones as they request. The second user avatar 402 may also view these similar mobile phones within the virtual world before purchasing. Once the second user avatar 402 has selected at least one device, they may add it to their virtual shopping cart and proceed to check out.

Figure 5:
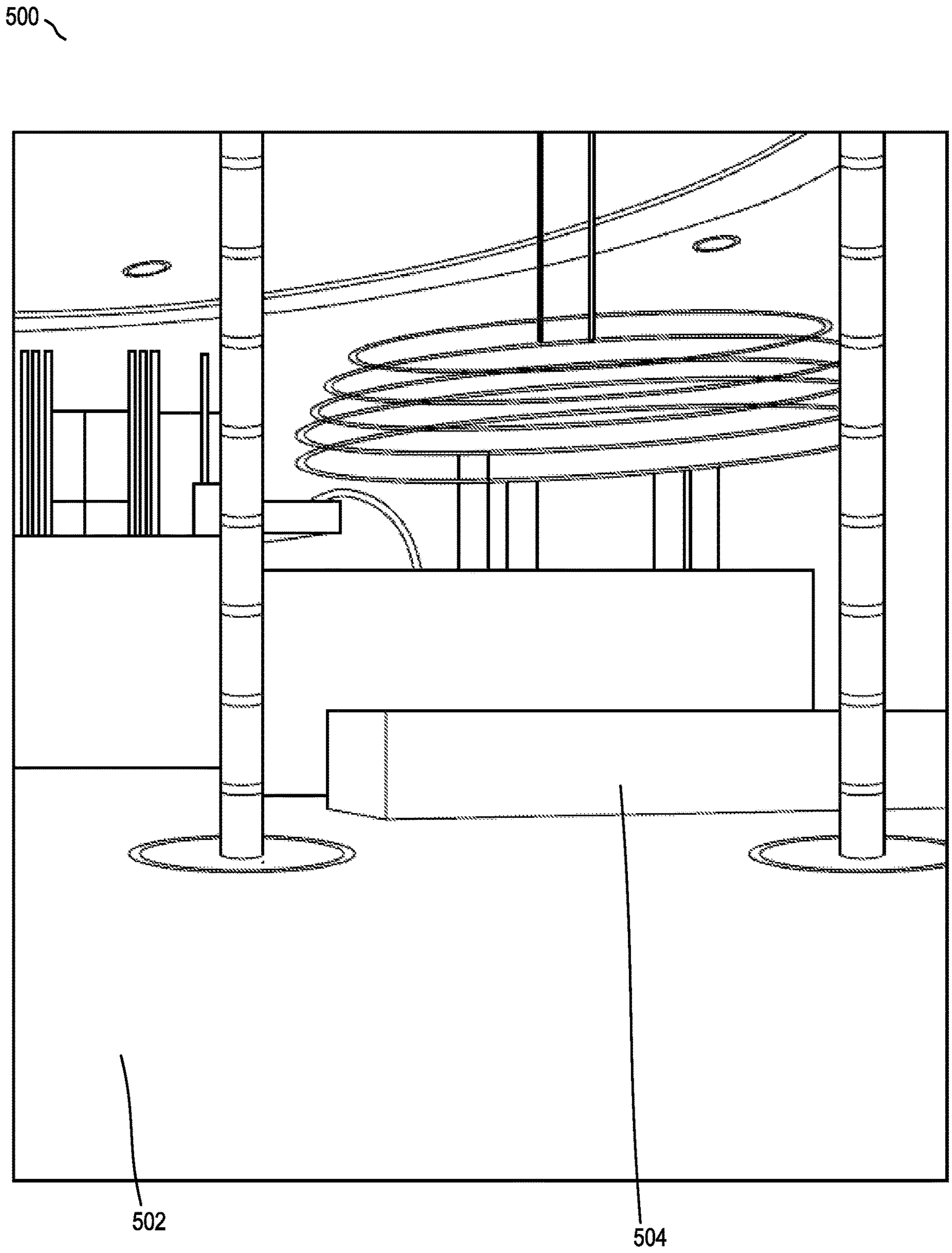
FIG. 5 illustrates a view of a virtual storefront according to an embodiment herein.

FIG. 5 illustrates a view 500 of a virtual storefront according to an embodiment herein. As shown, the virtual storefront includes a lobby 502 and a help desk 504. The lobby 502 may be a virtual lobby. The primary point of entrance for the user 102 is the lobby 502. The lobby 502 may serve as a focal point for information, networking, and access to other event components, simulating walking into an actual location. Features including event calendars, connections to other sessions or talks, and networking opportunities are available to the user 102. Additionally, the help desk 504 may be an online help desk. The help desk 504, often referred to as a service desk or support desk, is a single point of contact for the user 102 in the virtual world that offers guidance and support. Troubleshooting, problem-solving, and informational or advisory support on goods, services, or technological matters are the main goals of the help desk 504.

The virtual storefront or place of work within the one or more sources (for example, metaverse) may be a virtual representation of a physical store or place of work, allowing user avatars to access and interact with it remotely in a virtual environment. This may include a wide range of activities, such as browsing and purchasing products, attending meetings and conferences, collaborating with colleagues, and the like. Virtual stores and workplaces may be accessed through the device 110 with internet access and may be accessed through a web browser or a virtual reality headset. They may provide a convenient and immersive way for the user avatars to engage with businesses and organizations, regardless of their physical location.

Figure 6:
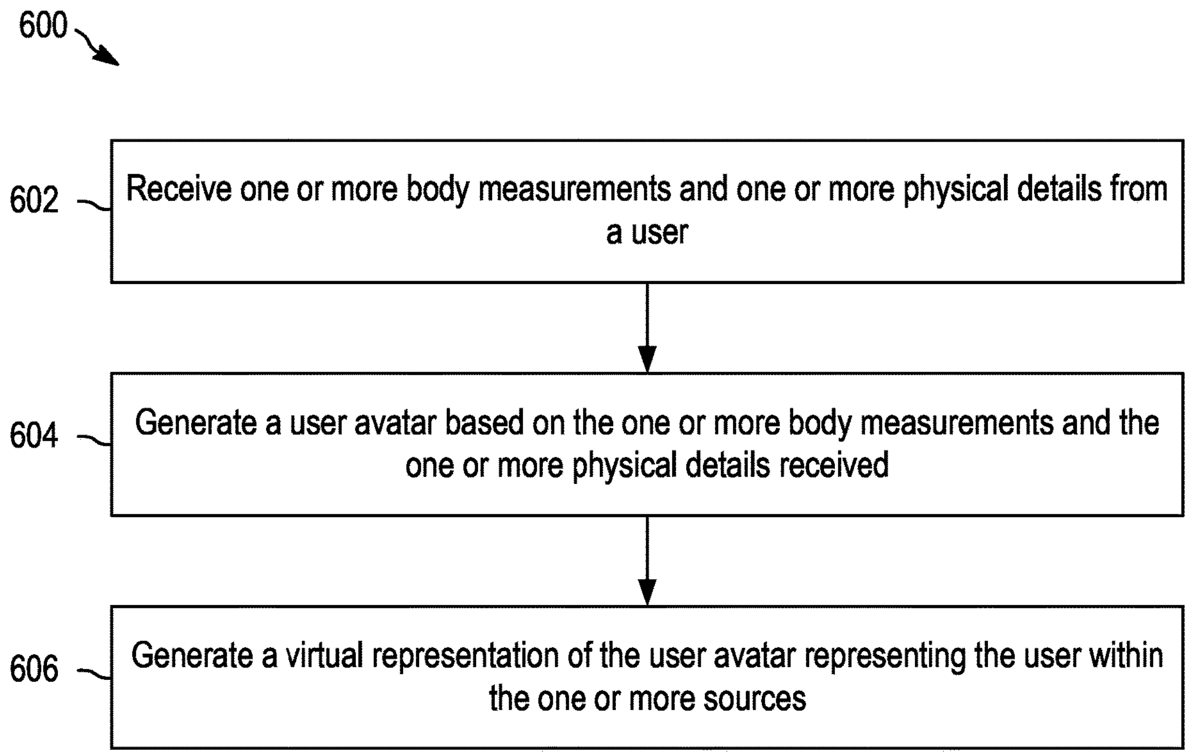
FIG. 6 illustrates a flowchart illustrating a method for implementing a customizable avatar in one or more sources according to an embodiment herein.

FIG. 6 illustrates a flowchart illustrating a method 600 for implementing a customizable avatar in one or more sources according to an embodiment herein. The steps 602-606 of the method 600 may be executed using the processor 104 of FIGS. 1-2. Each step is explained in further detail below.

At step 602, one or more body measurements and one or more physical details of the user 102 are received. The user 102 may manually enter the one or more body measurements and the physical information into the avatar application. Then, the database 230 may store the one or more body measurements and the physical information. The one or more body measures pertain to the various dimensions and proportions of the human body of the user 102. Examples of the one or more body measurements include but are not limited to height, weight, waist circumference, hip circumference, chest/bust circumference, inseam, arm length, neck circumference, foot length, and the like. The one or more physical details refer to the specific characteristics or features related to the physical aspect of the user 102. Examples of the one or more physical details include but are not limited to facial features, hair color, texture, style, skin tone/complexion, body size, or any other distinguishing marks. Additionally, the user 102 has the ability to edit the one or more physical details and body measurements at any moment. The database 230 may be rapidly modified with these updates.

At step 604, a user avatar is generated based on the one or more body measurements and the one or more physical details received in step 602. The user avatar is a graphical image or symbol representing the user 102 across one or more sources. The user avatar may take the shape of one or more forms, including their photos, cartoon-like pictures, original artwork, preset icons, and the like. The created user avatar may represent the identity of user 102 and be used to have conversations with other people in the one or more sources. Inputs from the user 102 on the avatar application may also allow for customization of the user avatar.

At step 606, a virtual representation of the user avatar generated in step 604 representing the user 102 within the one or more sources is generated. The real appearance of the user 102 is reflected or represented by the virtual representation. A virtual generation algorithm may be used to create the virtual representation. To create the virtual representation of the user 102, the algorithm first accepts one or more inputs, such as the preferences of the user 102, the one or more body measurements that the receive module 202 received, the one or more physical details that the receive module 202 received, and the like. The algorithm may determine the user avatar's components, colors, and style. To guarantee that the user 102 receives a distinctive and visually appealing avatar, the produced user avatar may be customized to some degree. This personalization may be based on factors like favorite colors, themes, other preferences the user 102 may provide, movements performed by the user 102 within the one or more sources, and the like.

The user 102 is not required to post any photos of themselves in this instance. Instead, the avatar application automatically generates the user avatar using the measurement inputs they supply through the receive module 202. Furthermore, the user avatar generated may be used across one or more applications. In an example, the one or more applications may include virtual fitting rooms, virtual fashion shows, virtual personal styling, virtual fashion design, virtual product demonstration, virtual events, virtual reality training, virtual try-on experiences, virtual health care, and the like.

Figure 7:
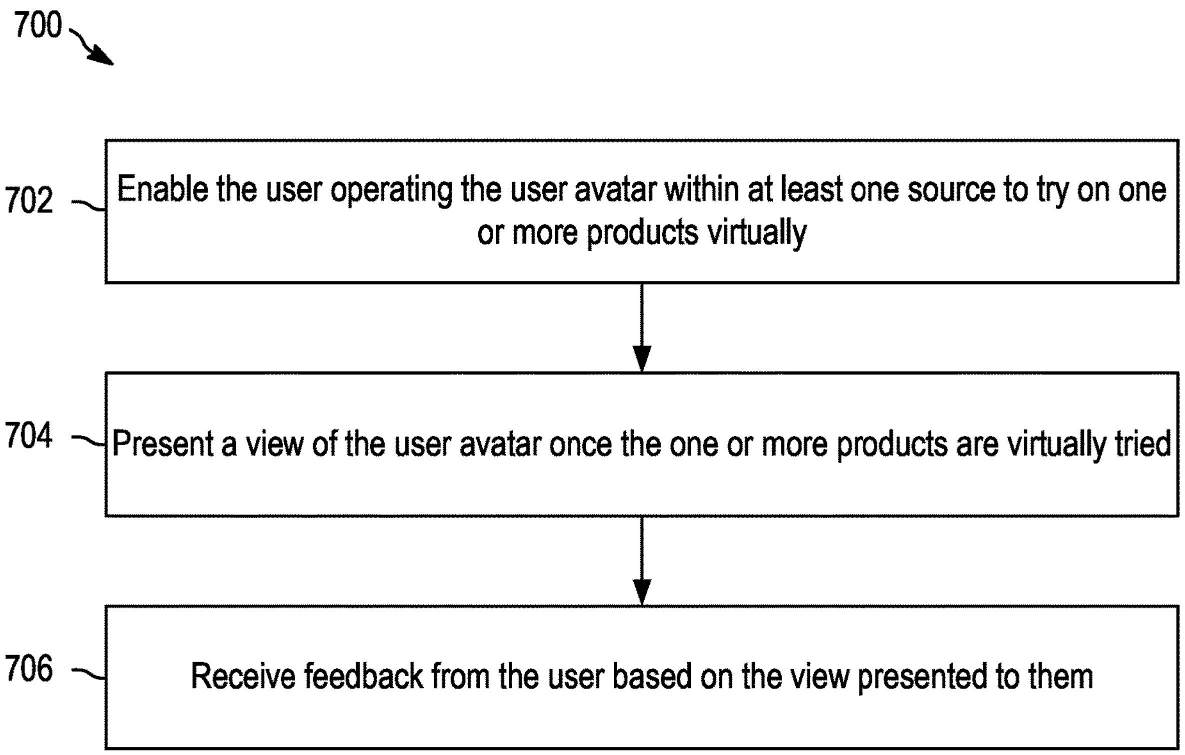
FIG. 7 illustrates a flowchart illustrating a method for generating a visual representation of the user avatar once one or more products are tried on according to an embodiment herein.

FIG. 7 illustrates a flowchart illustrating a method 700 for generating a visual representation of the user avatar once one or more products are tried on according to an embodiment herein. The steps 702-706 of the method 700 may be executed using the processor 104 of FIGS. 1-2. Each step is explained in further detail below.

At step 702, the user 102 operating the user avatar within at least one source is enabled to try on one or more products virtually. The user avatar may access a virtual environment when it has been imported into at least one source selected by the user 102. The virtual environment may, for instance, be a virtual mall or shopping center with several virtual stores that the user avatar may visit. The user avatar may browse through one or more of the products inside a virtual store as it walks or enters it-just like if a person were to physically walk into a store and look for things to buy. The database 230 contains the information on the virtual shops. For instance, the details may include store name, history, location, products sold, top rated products, reviews, and the like. The user 102 may thus be able to choose products that fit them well because the user avatar created by the user avatar generation module 204 corresponds with their physical characteristics and body dimensions.

For instance, the user avatar uses the avatar application to access a virtual clothes store where they wish to purchase one or more articles of apparel. One or more clothing pieces might be, for instance, a shirt, pants, socks, shoes, cap, spectacles, and the like. Before entering, the user avatar may also review the information about the virtual clothes shop stored in the database 230 of the avatar application. The user avatar may peruse the virtual apparel store's aisles and shelves and make appropriate selections. The user avatar clicks on the item or items that they want to purchase to make their selection. The experience of the user 102 using one or more sources is comparable to what it would be like to choose products in actual stores.

At step 704, a view of the user avatar once the one or more products/items are virtually tried within the one or more sources is presented to the user 102 on the device 110. After selecting the item or item, the user avatar on the avatar application is displayed with one or more clothing items by the virtual representation module 206. Thus, before making a purchase, the user 102 will be able to see themselves in the selected item or items and how it fits on their body. The avatar application displays information on every item the user avatar wears or tries on in addition to the view. The data might include the type of item, manufacturer, size, price, discounts, stock availability, and the like. As a result, the view that is produced offers a visual depiction of the user avatar that includes one or more objects and a description of each thing next to it. A display like this might help the user 102 make choices more quickly and effectively.

At step 706, feedback is received from the user 102 based on the view presented to them in step 704. For example, the user 102 may raise questions if they are dissatisfied with the items that the user avatar has tried on. For instance, the user 102 may submit feedback questions using the avatar application if they feel the pants' design is too simplistic or the top lacks color at the virtual apparel store. Giving feedback offers insightful information about the advantages and disadvantages of a shop. Businesses may be able to use this information to pinpoint their strengths and areas for improvement. Additionally, the user 102 feedback sheds light on their preferences. This might make it possible for online retailers to modify and launch new functions, goods, or services that suit the preferences of the 102.

The user 102 may provide their feedback using at least one of a voice message, verbal message, email message, gesture signal, and the like. With the click of a button (not shown) on the avatar application, the user 102 may provide their voice message, verbal message, and email message. The term "button", as used herein, may refer to any touch input that, when touched, causes the application to execute a command. Examples of the button include but are not limited to a mechanical button, digital button, capacitive sensing button, inductance sensing button, and holographic button.

For voice messages, the device 110 includes an in-built speaker and microphone, to which the user 102 may speak. After the user 102 submits their comment or inquiry, the processor 104 uses training data to generate a voice response for the user 102 after first transcribing their spoken input into text and extracting keywords from it. The user 102 on the device 110 is shown a chat window where they may enter in their comments or questions for spoken messaging. The chatbot is taught to comprehend questions and look up responses in a knowledge base using machine learning (ML) methods. The chatbot may draw extra knowledge from its past and present interactions with users to provide accurate responses.

Figure 8:
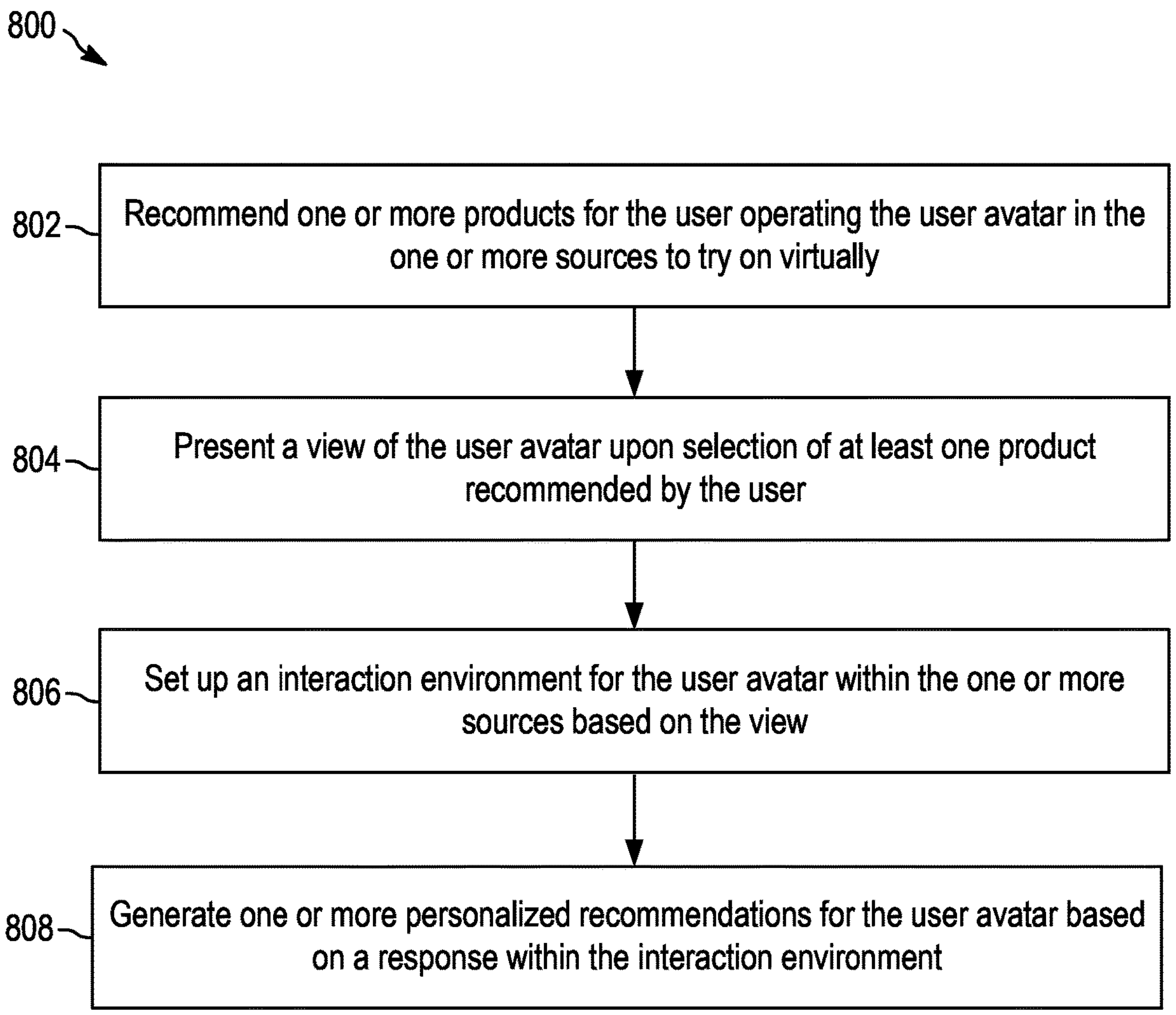
FIG. 8 illustrates a flowchart illustrating a method for providing recommendations and setting up an interaction environment with the user according to an embodiment herein.

FIG. 8 illustrates a flowchart illustrating a method 800 for providing recommendations and setting up an interaction environment with the user according to an embodiment herein. The steps 802-808 of the method 800 may be executed using the processor 104 of FIGS. 1-2. Each step is explained in further detail below.

At step 802, one or more products/items are recommended for the user 102 operating the user avatar in the one or more sources to try on virtually. When the user 102 is not using the avatar application or when the user avatar is essentially present in at least one source, one or more products or items may be suggested. Based on one or more inputs received or connected to the user 102, one or more products may be suggested. The one or more body measurements and physical data received via the receive module 202, comprehending and segmenting the user 102, analysis of the past purchases of the user 102, feedback supplied via the feedback module 210, and similar information are examples of one or more inputs. The one or more input details may be available in the database 230 or may be obtained from 3rd party sources via the use of application programming interfaces (APIs).

It is essential to obtain data on the tastes, activities, and history of the user 102 to provide beneficial product recommendations. To do this, data on the preferences and dislikes of the user 102 are gathered. This might include the brands, product categories, fashions, or qualities they find appealing. It may be possible to learn more about the tastes and purchasing habits of the user 102 by looking through their previous purchases. It facilitates determining the kinds of goods in which they have expressed interest or made past purchases. Additionally, seeing how the user 102 moves across websites or other platforms may provide insight into their interests. It may be possible to create a profile of the preferences of the user 102 by examining the pages they visit, the goods they click on, and the amount of time they spend in each area. It's also helpful to pay attention to comments and evaluations left for merchandise. This might provide clear insights into what customers find valuable in the goods or services and what would need to be improved. One or more virtual stores may sell the one or more things that the user 102 was advised to buy. The avatar program links to one or more virtual stores, saving the user from having to do their manual search for the relevant virtual store.

Furthermore, the product recommendation module 212 locates the recommended product or products in the virtual shop where the user avatar is now in or close to virtual stores. For instance, the user avatar would see "Aisle 3, Right Side, Second Shelve from the Top" as the suggested product's location. When the user 102 presses a "navigate" button (not shown) on the avatar application, the product recommendation module 212 may additionally route the user avatar to the location of the suggested product(s) in addition to providing the location. This may be useful in cases where the virtual store is large, and may also save time in the user avatar to search from the recommended product(s) upon reaching the aisle. To try on the recommended product(s), the user avatar clicks on them.

At step 804, a view of the user avatar is presented/generated upon selection of at least one product recommended to the user 102. The virtual trying module 208 receives information from the product recommendation module 212 regarding the one or more suggested products and, upon selection, allows the user avatar to try on the recommended product(s). The virtual representation module 206 displays the user avatar once it has been tried on. As a result, the user 102 will be able to see themselves in at least one of the products suggested to them and how it suits their physique. Alongside the view, the avatar application also presents additional information regarding each recommended product worn or tried by the user avatar. For instance, the additional information may include item type, manufacturer details, size, pricing, discounts (if any), stock availability, and the like.

At step 806, an interaction environment is set up for the user avatar within the one or more sources based on the view generated by the virtual representation module 206. The avatar application has an interact button (not shown), which the user 102 may click to customize the interaction environment. According to the one or more products that the product recommendation module 212 has advised, the interaction environment gives the user 102 a platform or chance to respond with comments, worries, or questions about how their user avatar looks. The user avatar may communicate with other avatars in the virtual shop or near them thanks to the interaction environment. Additionally, the interaction environment allows the user avatar to respond to the avatar application, which interprets the answer and looks for relevant solutions. The user avatar may provide the responses using at least one of a voice message, verbal message, email message, and the like.

At step 808, one or more personalized recommendations are generated for the user avatar based on the response within the interaction environment and the questions/queries/modifications/suggestions raised by the user avatar within the interaction environment. Personalized suggestions aim to provide the user avatar a more unique and pleasurable experience. Thus, the user 102 may find it easier to find pertinent products or material this way rather than having to manually sift through a large quantity of data. Additionally, the user 102 may be given one or more individualized recommendations by utilizing one or more alternatives. After that, the user 102 can select the choice or options that best suit their needs.

In one example, the user 102 asked the avatar application to recommend a different color shirt for the user avatar to test with the jeans that it is now wearing. The user 102 may then select from a few more color shirt selections by the personalized recommendation module 216. Any color recommendations or suggestions made by the user 102 may also be included in the selections. The personalized recommendation module 216 locates the personalized suggested product(s) and guides the user avatar there when the user 102 chooses at least one choice. After trying on these many colored shirts, the user avatar may choose which pairing of shirt and pants looks the best. As a result, depending on one or more views, inputs, or queries raised by the user 102 controlling the user avatar, the personalized recommendation module 216 is able to provide one or more customized suggestions for user avatars.

Figure 9:
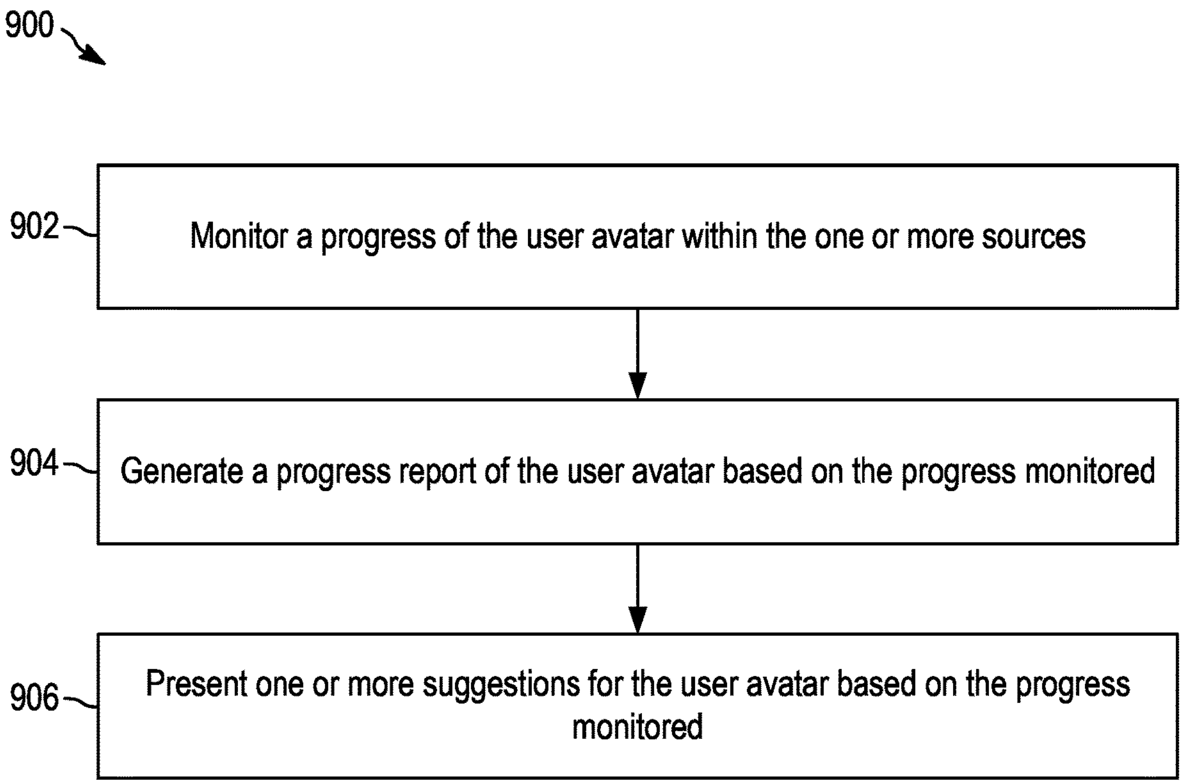
FIG. 9 illustrates a flowchart illustrating a method for monitoring the user avatar within the one or more sources according to an embodiment herein.

FIG. 9 illustrates a flowchart illustrating a method 900 for monitoring the user avatar within the one or more sources according to an embodiment herein. The steps 902-906 of the method 900 may be executed using the processor 104 of FIGS. 1-2. Each step is explained in further detail below.

At step 902, a progress of the user avatar within the one or more sources is monitored. The progress may involve tracking one or more factors, such as the user avatar's login and usage times in each source, the specific actions (like purchases) the user avatar takes in one or more sources, the changes made to the user avatar's appearance, the suggestions made by the product recommendation module 212 and the personalized recommendation module 216, the feedback that the feedback module 210 receives, and the like. Regular monitoring of one or more factors at specific intervals (e.g., one hour, three hours, six hours, one day, three days, and so forth) may be conducted. The user 102 may also be provided with the opportunity to adjust the time interval in the avatar application for the user avatar within the one or more sources.

At step 904, a progress report based on the progress monitored in step 902 is generated. The progress report presents an in-depth analysis of one or more factors. Several formats are available for the progress report, including tabular, graphical, picture, and video formats. One possible addition to the progress report would be a progress score produced by the progress module 220. The progress score can be displayed as an alphabet, a percentage, or a decimal number ranging from 0 to 100.

At step 906, one or more suggestions are presented for the user avatar based on the progress monitored in step 902. Using an AI/ML model trained to identify patterns, create representations, and make predictions based on a lot of data, the one or more suggestions may be identified. The AI/ML model may offer the one or more suggestions depending on one or more parameters. For example, the one or more parameters might include growth, hobbies or interests, feedback, the progress tracked by the progress module 220, and the like.

The growth parameter examines how the user avatar has progressed or how many times it has been utilized across one or more sources over a given period. The time frame is one month, three months, quarterly, yearly, or anything similar. Recommendations and proposals may be provided in light of the analysis to make purchases that differ from the ones that have already been made, acquire items from other sources, market or share user avatar information with one or more different platforms, and so forth. These suggestions may aid in enhancing the experience of the user 102 with the avatar application. The feedback parameter corresponds to comments or replies received from others who have monitored the user avatar within the one or more sources. The number of comments received, replies to these comments, likes/dislikes, and the like may be monitored here.

After logging into the avatar application, the user 102 may get the recommendations by email, textual, audio, or similar notifications. Regarding audio messages, the user 102 on the device 110 that they used to check in to the avatar application may hear the suggestions. The user 102 may receive the recommendations for written messages from a chatbot on the avatar application. After that, the user 102 may converse with the chatbot by posing queries or offering comments on the recommendations.

Figure 10:
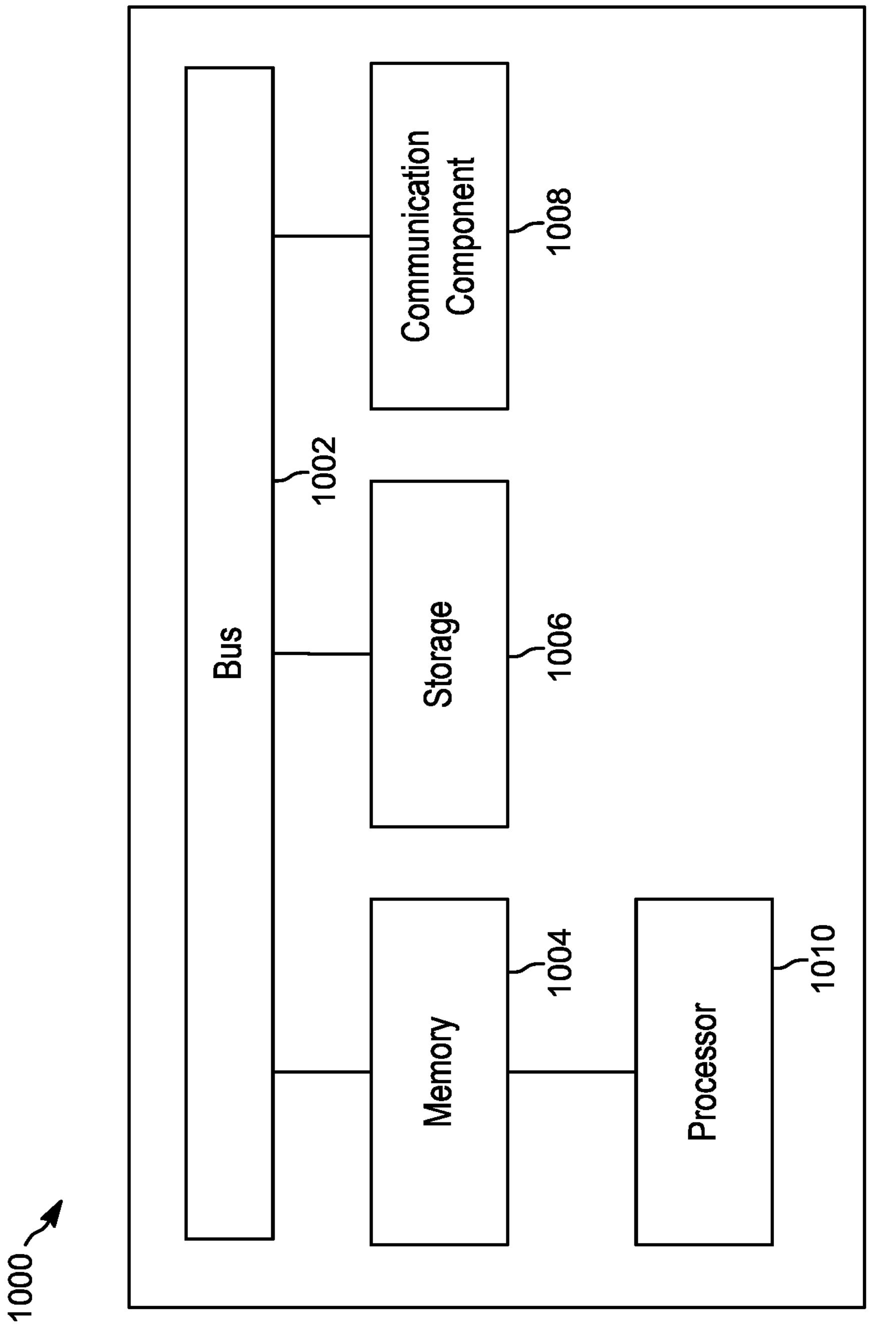
FIG. 10 illustrates a schematic of an embodiment of a computer system that may be implemented to carry out the disclosed subject matter.

FIG. 10 is a schematic of an embodiment of a computer system 1000 that may be implemented to carry out the disclosed subject matter. As shown, the computer system 1000 includes a bus 1002, a memory 1004, a storage 1006, a communication component 1008, and a processor 1010. The bus 1002 may connect the various components of the computer system 1000. The bus 1002 may be connected to the memory 1004, which stores data transmitted to the various parts of the computer system 1000 through the bus 1002. Various types of memory 1004 may be random access memory ("RAM") and read-only memory ("ROM"). The memory 1004 may transmit instructions to the processor 1010 to be executed.

The processor 1010 may process instructions that are transmitted to the processor 1010 from the memory 1004. Executed instructions may be transmitted from the memory 1004 to the various components of the computer system 1000. Various types of processors 1010 may be central processing units ("CPUs"), graphics processing units ("GPUs"), field programmable gate arrays ("FPGAs"), complex programming logic devices ("CPLDs"), and application specific integrated circuits ("ASICs"). The processor 1010 may execute instructions that are passed to the processor 1010 by the client user.

The computer system 1000 may include a storage 1006 that holds data for indefinite periods of time. The storage 1006 may continue to hold data even when the computer system 1000 is powered down. Various types of storage 1006 are magnetic tape drives, solid state drives, and flash drives. The communication component 1008 may transmit data from the memory 1004 to and from other computer systems. For example, a communication component 1008 may connect the computer system 1000 to the internet. Alternatively, the communication component 1008 may comprise an antenna that is configured to transmit and receive data. In various embodiments, the communication component 1008 may be a Bluetooth antenna, a WIFI antenna, or the like.

The system and method described herein duly generate a virtual representation of a user avatar of a user. The virtual representation is generated based on one or more inputs (one or more body measurements and physical details) provided by the user. The virtual representation is capable of being generated without the user uploading any images of themselves. The user avatar is customizable and will allow users to input their body measurements, ensuring that the user avatar generated accurately reflects their unique body shape and size. This will help to eliminate the guesswork and frustration associated with online shopping and will make it easier for the users to find clothing and other items that fit well and may look great on their user avatar.

The system and method described herein further recommends products for the user to virtually try on their user avatar once they have entered into a virtual store/shop in one or more sources (for example, metaverse, virtual world, web3 applications, etc.). Once these recommended products are tried on, the user avatar may receive feedback regarding their user avatar look from one or more other avatars nearby them or by asking the system (avatar application installed in their device) directly. Such features may help the user receive better opinions/feedback regarding the virtual avatar with the tried products and may thus improve their experience with the avatar application. Overall, the customizable user avatar will provide a more convenient and enjoyable shopping experience for users while also helping reduce the fashion industry's environmental impact by reducing the need for returns and excess shipping.

The foregoing description of the embodiments has been provided for purposes of illustration and not intended to limit the scope of the present disclosure. Individual components of a particular embodiment are generally not limited to that particular embodiment but are interchangeable. Such variations are not to be regarded as a departure from the present disclosure, and such modifications are considered to be within the scope of the present disclosure.

The embodiments herein and the various features and advantageous details thereof are explained with reference to the non-limiting embodiments in the following description. Descriptions of well-known components and processing techniques are omitted so as not to obscure the embodiments herein. The examples used herein are intended merely to facilitate an understanding of ways in which the embodiments herein may be practiced and to enable those of skill in the art further to practice the embodiments herein. Accordingly, the examples may not be construed as limiting the scope of the embodiments herein.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications may and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

Any discussion of documents, acts, materials, devices, articles, or the like that has been included in this specification is solely to provide a context for the disclosure. It is not to be taken as an admission that any of these matters form a part of the prior art base or were common general knowledge in the field relevant to the disclosure as it existed anywhere before the priority date of this application.

The numerical values mentioned for the various physical parameters, dimensions, or quantities are approximations, and it is envisaged that the values higher/lower than the numerical values assigned to the parameters, dimensions, or quantities fall within the scope of the disclosure unless there is a statement in the specification specific to the contrary.

While considerable emphasis has been placed herein on the components and component parts of the embodiments, it will be appreciated that many embodiments can be made and that many changes can be made in the embodiments without departing from the principles of the disclosure. These and other changes in the embodiment, as well as other embodiments of the disclosure, will be apparent to those skilled in the art from the disclosure herein, whereby it is to be distinctly understood that the foregoing descriptive matter is to be interpreted merely as illustrative of the disclosure and not as a limitation.

The invention claimed is:

1. A system for implementing a customizable avatar in one or more sources, the system comprising:

- a processor in communication with a memory, wherein the processor comprising:
  - a receive module configured to receive one or more body measurements and one or more physical details from a user;

a user avatar generation module configured to generate a user avatar based on the one or more body measurements and the one or more physical details received;

a virtual representation module configured to generate a virtual representation of the user avatar representing the user within the one or more sources, wherein the virtual representation of the user avatar reflects a physical appearance of the user; and an avatar score generation module configured to:

generate an avatar score by computationally evaluating alignment of the user avatar with the physical appearance of the user based on at least one of clarity, consistency, appropriateness, and uniqueness of the user avatar, wherein the consistency evaluates whether the user avatar corresponds to an intended projection of the user across the one or more sources; and generate a user avatar authenticity based on a mismatch between the user avatar and the physical appearance of the user.

2. The system as claimed in claim 1, wherein the one or more sources include a virtual world, metaverse, or Web3 applications.

3. The system as claimed in claim 1, wherein the processor is further configured to:

enable the user operating the user avatar within at least one source to try on one or more products virtually, wherein the one or more products are tried on within one or more virtual stores within each source;

present a view of the user avatar once the one or more products are virtually tried; and receive feedback from the user based on the view presented to them.

4. The system as claimed in claim 1, wherein the processor is further configured to:

recommend one or more products for the user operating the user avatar in the one or more sources to try on virtually, wherein the one or more products are recommended based on one or more inputs received from the user; and present a view of the user avatar upon selection of at least one product recommended by the user.

5. The system as claimed in claim 4, wherein the processor is further configured to:

set up an interaction environment for the user avatar within the one or more sources based on the view; and generate one or more personalized recommendations for the user avatar based on a response within the interaction environment.

6. The system as claimed in claim 1, wherein the processor is further configured to recommend one or more events for the user avatar to participate in within the one or more sources.

7. The system as claimed in claim 1, wherein the processor is further configured to:

monitor a progress of the user avatar within the one or more sources;

generate a progress report of the user avatar based on the progress monitored; and present one or more suggestions for the user avatar based on the progress monitored.

8. The system as claimed in claim 1, wherein the processor is further configured to enable the user to share the user avatar to one or more platforms.

9. The system as claimed in claim 8, wherein the processor is further configured to monitor a response of the user avatar when shared to the one or more platforms.

10. The system as claimed in claim 1, wherein the consistency further evaluates whether the virtual representation of the user avatar aligns with an identity of the user across the one or more sources.

11. A method for implementing a customizable avatar in one or more sources, the method comprising:

receiving, by a receive module of a processor in communication with a memory, one or more body measurements and one or more physical details from a user;

generating, by a user avatar generation module of the processor, a user avatar based on the one or more body measurements and the one or more physical details received;

generating, by a virtual representation module of the processor, a virtual representation of the user avatar representing the user within the one or more sources, wherein the virtual representation of the user avatar reflects a physical appearance of the user;

generating, by an avatar score generation module of the processor, an avatar score by computationally evaluating alignment of the user avatar with the physical appearance of the user based on at least one of clarity, consistency, appropriateness, and uniqueness of the user avatar, wherein the consistency evaluates whether the user avatar corresponds to an intended projection of the user across the one or more sources; and generating, by the avatar score generation module, a user avatar authenticity based on a mismatch between the user avatar and the physical appearance of the user.

12. The method as claimed in claim 11, wherein the one or more sources include a virtual world, metaverse, or Web3 applications.

13. The method as claimed in claim 11, further comprising:

enabling the user operating the user avatar within at least one source to try on one or more products virtually, wherein the one or more products are tried on within one or more virtual stores within each source;

presenting a view of the user avatar once the one or more products are virtually tried; and receiving feedback from the user based on the view presented to them.

14. The method as claimed in claim 11, further comprising:

recommending one or more products for the user operating the user avatar in the one or more sources to try on virtually, wherein the one or more products are recommended based on one or more inputs received from the user; and presenting a view of the user avatar upon selection of at least one product recommended by the user.

15. The method as claimed in claim 14, further comprising:

setting up an interaction environment for the user avatar within the one or more sources based on the view; and generating one or more personalized recommendations for the user avatar based on a response within the interaction environment.

16. The method as claimed in claim 11, further comprising recommending one or more events for the user avatar to participate in within the one or more sources.

17. The method as claimed in claim 11, further comprising:

monitoring a progress of the user avatar within the one or more sources;

generating a progress report of the user avatar based on the progress monitored; and presenting one or more suggestions for the user avatar based on the progress monitored.

18. The method as claimed in claim 11, further comprising:

enabling the user to share the user avatar to one or more platforms; and monitoring a response of the user avatar when shared to the one or more platforms.

19. One or more non-transitory computer-readable storage mediums storing one or more sequences of instructions, which when executed by one or more processors, causes the one or more processors to perform one or more steps comprising:

receiving one or more body measurements and one or more physical details from a user;

generating a user avatar based on the one or more body measurements and the one or more physical details received;

generating a virtual representation of the user avatar representing the user within one or more sources, wherein the virtual representation of the user avatar reflects a physical appearance of the user;

generating an avatar score by computationally evaluating alignment of the user avatar with the physical appearance of the user based on at least one of clarity, consistency, appropriateness, and uniqueness of the user avatar, wherein the consistency evaluates whether the user avatar corresponds to an intended projection of the user across the one or more sources; and generating a user avatar authenticity based on a mismatch between the user avatar and the physical appearance of the user.

* * * * *